3,651,167
SELECTIVE HYDROGENATION OF
C₄-ACETYLENIC HYDROCARBONS
Armand J. de Rosset, Clarendon Hills, Ill., assignor to
Universal Oil Products Company, Des Plaines, Ill.
No Drawing. Continuation-in-part of application Ser. No.
745,963, July 19, 1968. This application Aug. 3, 1970,
Ser. No. 60,656
Int. Cl. C07c 7/00
U.S. Cl. 260—681.5                                8 Claims

ABSTRACT OF THE DISCLOSURE

Selective hydrogenation of $C_4$-acetylenes, for example ethylacetylene and/or dimethylacetylene, in admixture with butadiene, is effected in a fixed-bed system using a Group VIII noble metal component catalyst. A preferred catalyst comprises palladium in an amount of about 0.01% to about 0.2% by weight. Operating conditions include a temperature of from 35° C. to about 70° C. and a pressure in the range of about 10 p.s.i.g. to about 40 p.s.i.g. Catalyst stability is improved since the Group VIII metal components is surface-impregnated onto the porous carrier material.

RELATED APPLICATION

The present application is a continuation-in-part of my copending application, Ser. No. 745,963, filed July 19, 1968, now abandoned, all the teachings of which copending application are incorporated herein by specific reference thereto.

APPLICABILITY OF INVENTION

The present invention relates to a catalytic process for effecting the selective hydrogenation of unsaturated hydrocarbons. As utilized herein, the term "selective hydrogenation" connotes the simultaneous treatment of two or more unsaturated hydrocarbons having, for the most part, varying degrees of unsaturation. Specifically, the process encompassed by the present invention involves the selective hydrogenation of a $C_4$-acetylene, such as ethylacetylene and/or dimethyl acetylene, in the presence of large quantities of butadiene which may contain 1-butene and/or 2-butene, without hydrogenative degradation of the butadiene concentrate.

Butadiene, sometimes referred to as vinylethylene, is derived in large quantities from the catalytic dehydrogenation of butanes and butenes. Other principal sources of butadiene include various petroleum various petroleum refinery off-gases and the gaseous products recovered from various hydrocarbon cracking operations. The principal utility of butadiene resides in its value as a starting material to produce high molecular weight polymers. Thus, a primary use is in the production of synthetic rubber, including styrene-butadiene rubber, nitrile-butadiene rubber, buna-S rubber, and trans polybutadiene rubber. Other uses are as the starting material for adiponitrile and styrene-butadiene latex in paints. Similar utility for 1-butene and 2-butene are widespread, although a primary use of these unsaturated hydrocarbons resides in the synthesis of butadiene.

When butadiene is recovered from any one of its sources, it is seldom obtained in a degree of purity required for its subsequent use in the preparation of other organic compounds. The principal impurities are $C_4$-acetylenes, namely ethylacetylene and dimethyl acetylene, with ethylacetylene being in the greater concentration. In accordance with the present invention, the hydrogenation of the $C_4$-acetylene, in admixture with butadiene, is effected through the use of an active, novel catalytic composite and under particular conditions of operation which insure that little, if any, reduction in the quantity of butadiene is experienced, and selective hydrogenation of the $C_4$-acetylene is obtained over an extended period of time as a result of increased catalyst stability.

OBJECTS AND EMBODIMENTS

As hereinbefore set forth, charge stocks, to which the present invention is applicable, include normally gaseous mixtures obtained from cracking operations such as naphtha pyrolysis units. In general, the pyrolysis off-gas is subjected to separation to provide an ethylene concentrate, a propylene concentrate and a butadiene concentrate. With respect to catalytic processing for the selective hydrogenation of acetylenic hydrocarbons in these various concentrates, the heavy concentration of butadiene in the last-mentioned feed stock imposes a more severe burden on a given catalytic composite than either ethylene concentrate or the propylene concentrate. This is due principally to the fact that butadiene competes more closely with the $C_4$-acetylenes for hydrogen, as contrasted to the mono-olefins, and therefore tends to shorten the effective life of the catalyst through its natural tendency to deposit polymers.

Therefore, an object of the present invention is to provide a process for the selective hydrogenation of certain unsaturated hydrocarbons without disturbing, to a significant degree, other unsaturated hydrocarbons containing a type of unsaturation different from that of the undesired hydrocarbons. A corollary objective is to hydrogenate selectively those hydrocarbons containing an acetylenic degree of unsaturation without disturbing desired diolefinic hydrocarbons in admixture therewith.

A more specific object of my invention is to hydrogenate selectively ethylacetylene in admixture with butadiene without effecting a significant loss of the latter.

Another object is to prolong the effective life of the catalytic composite utilized in selectively hydrogenating $C_4$-acetylenes, including ethylacetylene and/or dimethyl acetylene, in the presence of large quantities of butadiene.

Still another object is to provide a new composition of matter for use in a process for olefin hydrogenation, and particularly in a process for di-olefin and acetylene hydrogenation.

Therefore, in one embodiment, the present invention affords a process for the selective hydrogenation of a $C_4$-acetylene, in admixture with butadiene, without substantial hydrogenation of the butadiene, which process comprises reacting said mixture with hydrogen in an amount in excess of that required to convert said $C_4$-acetylene and less than 0.1 mole of hydrogen per mole of butadiene, at a temperature below about 70° C., in contact with a catalyst comprising an alumina carrier material, from about 0.01% to about 0.5% by weight of a surface-impregnated Group VIII noble metal and from about 0.1% to about 1.0% by weight of an alkali metal.

A specific embodiment affords a novel catalyst particle consisting essentially of alumina, from about 0.1% to about 1.0% by weight of lithium, from about 0.01% to about 0.5% by weight of a surface-impregnated Group VIII noble metal and from about 0.001% to about 0.015% by weight of a Group I-B metal selected from copper and silver.

Other embodiments of my invention reside primarily in the character of the noble metal catalyst for use in the process. These as well as other embodiments and objects will become apparent from the following detailed description.

SUMMARY OF INVENTION

As hereinafter illustrated through the use of specific examples, the present invention is founded upon recognition of the principal cause of rapid catalyst deactivation while attempting the selective hydrogenation of ethylacetylene when in admixture with butadiene. It should be noted that, while the cause of rapid catalyst deactivation is of the same general character as that arising in the selective hydrogenation of acetylenes in both ethylene and propylene concentrates, namely polymer formation, the difficulty which arises is compounded by the fact that both butadiene and ethylacetylene readily tend to form polymers. Whereas both ethylene and propylene form polymers, the propensity to do so, during the selective hydrogenation of acetylenic contaminants, is significantly less pronounced. In brief, hydrogenation processes, and the techniques integrated therein, which are suitable for obtaining either ethylene concentrates or propylene concentrates, do not suffice for hydrogenation of $C_4$-acetylenes to obtain a butadiene concentrate.

Hydrogenation of unsaturated hydrocarbons is generally effected at relatively severe temperatures of from 100° C. to about 200° C., and at imposed hydrogen pressures of from 200 to as high as 1000 p.s.i.g. At these operating conditions, generally utilized for the selective hydrogenation of acetylene in ethylene concentrates, the process is effected in liquid phase. With respect to the removal, or selective hydrogenation, of methylacetylene and allene from a propylene concentrate, liquid-phase operating conditions further promote the tendency of the methylacetylene and allene to undergo polymerization and co-polymerization, or condensation reactions resulting in the formation of methylacetylene polymer. This polymer has been found in various preheater tubes and lines, and other attendant manifolding, as well as upon the catalytic composite disposed within the reaction zone.

I have previously found that the selective hydrogenation of methylacetylene and allene in a propylene concentrate can be successfully effected over a prolonged period of time provided the hydrogenation conditions are selected to provide a vapor phase operation. Suitable preferred operating conditions, for the selective hydrogenation of methylacetylene in a propylene concentrate, include a pressure in the range of from 50 to 175 p.s.i.g., a temperature of from 30° C. to about 75° C., and a gaseous hourly space velocity (GHSV) range of about 2500 to about 10,000 cubic feet of gas per cubic foot of catalyst per hour. Significantly, these ranges for the principal operating conditions do not foster acceptable results in a process for the selective hydrogenation of $C_4$-acetylenes in a butadiene concentrate. This, as hereinbefore set forth, is due primarily to the fact that butadiene competes more vigorously with the $C_4$-acetylenes for hydrogen, as contrasted to the mono-olefins, and tends to shorten catalyst life through its own natural tendency to deposit polymer.

In accordance with the process of the present invention, the selective hydrogenation of a $C_4$-acetylene, in admixture with butadiene, is effected in vapor phase, and in contact with a catalyst containing less than 0.5% by weight of a Group VIII noble metal and at hydrogenation conditions including a temperature below 70° C. As hereinafter indicated, in specific examples, the residual ethylacetylene level was lower than 60° C. than at 70° C., the higher temperature apparently accelerating the rate of polymer accumulation. Furthermore, catalysts containing 0.5% by weight of palladium gave consistently poorer results than did catalysts containing as low as 0.1% by weight of palladium. Therefore, preferred operating conditions include a temperature in the range of from about 35° C. to about 65° C., and the catalyst contains less than 0.5% by weight of a Group VIII noble metal, and preferably from about 0.01% to about 0.2% by weight. The hydrogenation conditions further include a pressure below about 50 p.s.i.g. and a gas hourly space velocity (GHSV) less than about 1000. Lower ranges of these operating variables are preferred, and include a pressure from about 10 p.s.i.g. to about 40 p.s.i.g. and a gaseous hourly space velocity within the range of from 150 to about 800. The $C_4$-acetylene/ butadiene concentrate is treated with hydrogen in an amount in excess of that required to convert the $C_4$-acetylenes, but less than 0.1 mole per mole of butadiene in the feed stock. Higher concentrations of hydrogen are avoided in order to limit the loss of butadiene through conversion to a mono-olefin.

DESCRIPTION OF CATALYTIC COMPOSITE

The hydrogenation catalytic composite, suitable for use in the present process, comprises a noble metal of Group VIII of the Periodic Table, composited with a refractory inorganic oxide carrier material. Thus, the catalytic composite may contain one or more of ruthenium, rhodium, palladium, osmium, iridium, and platinum, and various compounds thereof, in a total amount less than about 0.5% by weight, calculated as the elements thereof. A particularly preferred catalytic composite comprises a metallic component from the group of platinum and palladium combined with a non-acidic refractory inorganic oxide material such as alumina. It is further preferred that the alumina be pre-treated through the addition of a non-acid-acting component such as the salts and hydroxides of alkaline metals and alkaline-earth metals, specific examples of which include lithium nitrate, lithium hydroxide, potassium nitrate, potassium hydroxide, sodium nitrate, sodium hydroxide, calcium nitrate, magnesium nitrate, etc. While the precise manner by which the catalytic composite is prepared is not an essential feature of the present invention, it is a requirement that the selected preparation scheme result in a catalyst particle in which the catalytically active Group VIII noble metal is surface-impregnated. This type of catalyst results in lower residual $C_4$-acetylene values, accompanied by greater butadiene retention, than those catalysts which have been bulk-impregnated, or thoroughly-impregnated within and throughout the carrier material.

Although "surface-impregnated" catalysts have achieved an individual status in the art, and further are considered unique by those possessing expertise in the realm of catalysis, the merit thereof for the selective hydrogenation of $C_4$-acetylenes is not recognized. With respect to the selected hydrogenation catalyst, it is important to consider the adsorption-diffusion behavior of the feed components, butadiene and the $C_4$-acetylenes. As indicated by its longer chromatographic retention time, a $C_4$-acetylene, for example, ethylacetylene, is more strongly adsorbed than butadiene. During the diffusion of the vaporous feed into the catalyst particles, the ethylacetylene has the propensity and tendency to concentrate near, or at the surface and, considering a "surface-impregnated" catalyst, will be hydrogenated at this locus of the catalyst particle. The butadiene will be diffused to the interior cages (pores) and surfaces, but, since no catalyst promoter sites are present therein, will not degrade due to hydrogenation thereof. To the contrary, such promoter sites are present in a "thoroughly-impregnated," or "uniformly-impregnated" catalyst; these are not blocked by ethylacetylene, or any other $C_4$-acetylene, and the butadiene, which diffuses into the interior of the catalyst particle, will tend to undergo hydrogenation.

Reference is herein made to United States Pat. Nos. 3,259,454 (Cl. 2–23), 3,259,589 (Cl. 252–466) and 3,388,077 (Cl. 252–466) wherein the differentiation among various impregnated composites is clearly delineated. Considering only the 3,259,589 patent, patentee describes "surface-impregnation" by his FIG. 1 and "thorough-impregnation" by his FIG. 4. Remaining FIGS. 2 and 3 are illustrative of two additional forms of catalyst particle resulting from varying the impregnation technique, that of FIG. 2 being the basis of patentee's inventive concept. It should be noted that these patents disclose various schemes for manufacturing impregnated catalysts, any one of which can be used to prepare the catalyst of the present invention with the restriction that the final particle has the catalytically active noble metal component in a "surface-impregnated" state. Such a catalyst particle is typically retained on a U.S. No. 30 standard screen and is passed by a U.S. No. 4 standard screen. Substantially all of the surface-impregnated active metal component is contained in a surface shell having a thickness not greater than 0.005 inch.

Of further interest, in regard to the character of the catalytic composite, is that the use of a copper component modifier, in addition to the Group VIII metallic component, affords a slight improvement where the lithiated alumina carrier material is thoroughly-impregnated with the Group VIII metal. To the contrary, a silver component modifier appears to be somewhat detrimental.

However, with respect to a surface-impregnated catalyst, the addition of a silver component modifier appears to afford an improvement, while the use of a copper component modifier seems to have a lesser effect. When employed as catalyst modifiers, silver is used in an amount in the range of 0.005% to about 0.015% by weight, while copper is in the range of from 0.001% to about 0.01% by weight, calculated as the elemental metals.

The addition of an alkali metal component, for example, lithium, to the catalytic composite is not intended to promote, or effect any particular reaction, but rather to attenuate undesirable catalytic activity and reactions. The alumina carrier material possesses strongly acid hydrogens at or near the surface. Such sites are conductive, as potential proton donors, to effecting carbonium ion reactions, the principal one of which is olefin polymerization. This undesirable effect is countered by replacing the strongly acid hydrogen with lithium, or potassium. The alkali metal component is preferably combined by way of an initial impregnation technique, or by a co-precipitation method during the formation of an alumina hydrogel. In any event, the calcination of the resulting "lithiated" alumina should not be carried out at temperatures significantly higher than about 600° C. Elevated temperatures—i.e. 900° C. to about 1300° C.—will produce an alumina-lithium spinel, determinable by X-ray diffraction. Further, there is no danger of the catalytic surface becoming sintered.

The catalytic composite, containing from about 0.01% to about 0.5% by weight of a Group VIII noble metal component and about 0.1% to about 1.0% by weight of an alkali metal component, both of which are calculated as if existing as the elemental metals, is placed within the reaction zone maintained at operating conditions in the aforesaid ranges. The charge stock, comprising a mixture of butadiene, ethylacetylene and possibly minor quantities of 1-butene and 2-butene, is admixed with a molar excess of hydrogen and introduced into the reaction zone. The thus-treated charge stock is withdrawn and recovered, analyses thereof indicating a relatively minor amount of ethylacetylene, the major proportion being butadiene with a minor degree of conversion to butene and/or butane.

EXAMPLES

The following examples are introduced for the primary purpose of further illustrating the method and utility of the present invention, but not with the intention of unduly limiting the same beyond the scope and spirit of the appended claims. Additional methods of preparing the surface-impregnated catalytic composite are integrated into these examples.

Various catalytic composites were utilized in the examples which follow. In general, the methods of preparation subscribed to the same overall scheme. The lithiated alumina was prepared by initially forming alumina spheres by the well known oil-drop method as set forth in U.S. Pat. No. 2,620,314 (Cl. 252–448). An impregnating solution of 18.1 grams of lithium nitrate, dissolved in 550 cc. of water, was poured over 360 grams of calcined alumina spheres, and the mixture dried in a rotating evaporator. The dried lithiated alumina carrier material was then calcined for two hours at 550° C., and ground to 20/30 mesh. Analysis indicated 0.5% by weight of lithium, calculated as the element.

Three different schemes were employed to incorporate a palladium component: (1) an aqueous solution of chloropalladic acid, in an impregnating step; (2) chloropalladic acid, in admixture with thiomalic acid; and (3) an aqueous solution of palladium nitrate. The latter impregnating solution was prepared by placing 0.473 grams of palladium wire in 100 ml. of water and 60 ml. of concentrated nitric acid. Upon heating and the addition of one drop of a 5.0% hydrobromic acid solution, the palladium wire started to dissolve. Evaporation was effected until the wire had completely dissolved (about 40 ml. remaining). The resulting solution was diluted to 250 ml. with water. In all preparations, the required amount of impregnating solution was poured over the lithiated alumina, evaporated to dryness, and calcined at 600° C. for a period of two to three hours. Preparations (2) and (3) above produced a surface-impregnated composite, whereas scheme (1) resulted in a composite in which the palladium was thoroughly-impregnated.

The charge stock was a 50/50 mole mixture of butane-butadiene contaminated by the addition of 800–900 p.p.m. of ethylacetylene. The charge stock was admixed with 2.0 mol percent hydrogen, pumped and vaporized over a charcoal bed at 100° C., and passed into the reaction zone, containing 5.0 cc. of 20/30 mesh catalyst. The pressure was 20.0 p.s.i.g., the temperature, at the inlet to the catalyst bed was either 60° C. or 70° C., and the gaseous hourly space velocity was about 700. Unless otherwise stated, these conditions were utilized throughout the examples. The charge stock had the composition shown in the following Table I; in addition, analysis indicated 885 p.p.m. of ethylacetylene.

TABLE I.—Analysis, butadiene concentrate

| Component: | Mol percent |
| --- | --- |
| Butane | 49.4 |
| Butadiene | 48.1 |
| 1-butene | 0.1 |
| 2-butene | 0.2 |
| Hydrogen | 2.0 |

Analyses for residual ethylacetylene were made by scrubbing the effluent gas through alcoholic silver nitrate.

With respect to the charge stock being a 50/50 mixture of butane/butadiene, the butane was utilized to simulate the dilution of a butadiene concentrate with $C_4$-acetylene and butylene, as would be the expected effluent from a butylene dehydrogenation process, or from a naphtha pyrolysis unit. Furthermore, the substitution of butane for butylene simplifies the analytical detection of the principal undesired reaction, the conversion of butadiene to butylene. Where a small, but significant degree of such conversion is undetected in the presence of large amounts of feed butylene, it is readily measurable where the feed contains only minor amounts of butylene. Since butylene and butane are closer to each other with respect to adsorption characteristics, than they are to acetylenic and conjugated di-olefinic hydrocarbons, the substitution of butane does not affect or mask the results. In a commercial unit, butadiene is separated from butylene by way of extractive distillation using, for example, cuprous ammonium acetate, or acetonitrile.

EXAMPLE I

Two catalysts were prepared with the lithiated alumina carrier material in an impregnation technique using sufficient palladium chloride to composite therewith 0.1% and 0.5% by weight of palladium, calculated as the element. Each catalyst was used twice at the foregoing conditions; once at a temperature of 60° C. and once at 70° C. Four 10-hour tests were conducted at each temperature level with the 0.1% palladium catalyst, while two 10-hour tests at each temperature were conducted with the 0.5% palladium catalyst. The results, with respect to residual acetylene, are given in the following Table II:

TABLE II.—EFFECT OF PALLADIUM CONCENTRATION

| Temp., °C. | Wt. percent, Pd | Ethylacetylene, p.p.m. |
|---|---|---|
| 60 | 0.5 | 66 |
| 60 | 0.5 | 69 |
| 70 | 0.5 | 172 |
| 70 | 0.5 | 150 |
| 60 | 0.1 | 41 |
| 60 | 0.1 | 59 |
| 60 | 0.1 | 53 |
| 60 | 0.1 | 50 |
| 70 | 0.1 | 82 |
| 70 | 0.1 | 106 |
| 70 | 0.1 | 77 |
| 70 | 0.1 | 57 |

Not only is the effect of palladium content readily apparent, but the effect of temperature is also noticeable. At 60° C. and 0.5% palladium, the average residual acetylene was 68 p.p.m. This average increased to 161 p.p.m. when the catalyst bed inlet temperature was increased to 70° C. Similarly, at 0.1% palladium and 60° C., the average residual ethylacetylene was 51 p.p.m., while at 70° C., the average was 81 p.p.m. Upon comparing residual ethylacetylene content at the different palladium concentrations, it will be noted that the lower concentration of palladium was consistently better, regardless of the temperature level. Thus, at 60° C., the 0.5% palladium catalyst reduced the ethylacetylene to an average of 68 p.p.m., whereas the 0.1% palladium catalyst reduced the ethylacetylene content to an average of 51 p.p.m.

EXAMPLE II

Three catalysts were prepared, each to contain 0.1% palladium by weight. Three different impregnating solutions were employed: (1) the aqueous chloropalladic acid, (2) aqueous chloropalladic acid (5.9 ml.) with thiomalic acid (3.2 ml.), and (3) aqueous palladium nitrate prepared as previously described. Ten-hour tests were conducted at both temperature levels of 60° C. and 70° C., the other conditions of operation being as previously stated. The results are set out in the following Table III:

TABLE III.—EFFECT OF IMPREGNATING METHOD

| Impregnating solution | Residual ethylacetylene, p.p.m. | | |
|---|---|---|---|
| | CPA | CPA/TMA | NO₃⁻ |
| 60° C | 59 | 53 | 53 |
| 70° C | 106 | 77 | 70 |

That surface impregnation, as shown by the results of the palladium nitrate ($NO_3$) and the chloropalladic acid-thiomalic acid (CPA/TMA), offers additional advantages, is evident from the data in Table III. The residual ethylacetylene levels were consistently lower than those obtained with the catalyst in which the active component is dispersed throughout the carrier material.

Another comparison of the two methods of impregnation was made at the 0.5% palladium level and with a catalyst bed inlet temperature of 60° C. The palladium chloride-impregnated catalyst (thorough) resulted in an effluent having 66 p.p.m. residual ethylacetylene, while the palladium nitrate-impregnated catalyst (surface) produced an effluent containing 44 p.p.m. residual ethylacetylene.

EXAMPLE III

The procedure followed to obtain the data presented herein, was virtually the same utilized previously. The catalytic composite was the previously described lithiated alumina with palladium concentrations of 0.05% and 0.1% by weight. In some instances, additional metallic promoters were incorporated; these were selected from silver, copper and lead. Previous work with these promoters indicated that, at 60° C., the copper-modified catalyst, with thorough impregnation of palladium, resulted in a measurable improvement, while the silver modification was somewhat detrimental.

A catalyst life test was instituted to determine the feasibility of adding a copper promoter to the catalyst. The composite was prepared by adding 4.0 ml. of a palladium nitrate solution (0.00189 gram of palladium per milliliter) and 4.4 ml. of a copper nitrate solution (0.000102 gram of copper per milliliter) to 7.0 ml. of water. The solution was poured over 7.5 grams of 20/30 mesh lithiated alumina, and evaporated to dryness. The dried composite was calcined for a period of two hours at a temperature of 600° C. The catalyst contained 0.1% palladium, 0.006% copper and 0.5% lithium. The catalyst was placed in a reaction zone at 20.0 p.s.i.g., 60° C. and with a GHSV of 600 to 700. After 8 hours on-stream, analysis of the gaseous effluent indicated a residual ethylacetylene content of 9.5 p.p.m. At the termination of 30 on-streatm hours, continuing at 60° C., the residual ethylacetylene was 33 p.p.m., the butane concentration 49.9 mol percent, and the butadiene concentration 48.0 mol percent. Both the 1-butene and 2-butene concentration had increased about 0.6 mol percent. Following 78 hours of on-stream operation, the ethylacetylene concentration was found to be 67 p.p.m., and the butadiene concentration had increased to 51.4 mol percent. Increasing the temperature to 70° C. and above, at the inlet to the catalyst bed, caused the residual ethylacetylene content to increase steadily over four 20-hour test periods, from 147 p.p.m. to 841 p.p.m.

Using 0.05% by weight of palladium, surface-impregnated by means of the palladium nitrate solution, at 60° C., the residual ethylacetylene content, after 18 hours on-stream, was 32 p.p.m. This increased to 79 p.p.m. and subsequently to 244 p.p.m. with the temperature at 70° C.

Thorough impregnation of 0.1% by weight of palladium, using chloropalladic acid, modified by 0.02% by weight of lead, resulted in an ethylacetylene content of 140 p.p.m., following 18 hours of on-stream operation.

Two additional operations were effected at 60° C., 20.0 p.s.i.g. and about 600–700 GHSV, with 2.0 mol percent hydrogen in the feedstock. Two different catalysts were utilized in amounts of 5.0 cc. These were surface-impregnated composites of 0.1% palladium on the lithiated alumina carrier material (0.5% by weight of lithium); one catalyst contained 0.006% by weight of copper and the other, 0.01% by weight of silver. These catalysts are referred to as catalysts "A" and "B," respectively, in the following Table IV:

TABLE IV

| Catalyst designation | A | B |
|---|---|---|
| Residual ethylacetylene, p.p.m.: | | |
| Test 1 | 41 | 17 |
| Test 2 | | 27 |

From the foregoing data, it was concluded that acceptable operation of a process for the selective hydrogenation of ethylacetylene, to reduce the latter to about 40–60 p.p.m., was attainable provided the maximum inlet catalyst temperature was less than 70° C., and the catalyst contained less than 0.5% by weight of palladium. Further, it appears from the data that results are further enhanced where the catalytic component is surface-impregnated upon the carrier material. Modifiers, preferably minor quantities of copper and silver, appear to improve the results with surface-impregnated catalysts.

The object of the operations hereinafter described was to lengthen the effective catalyst life, or stability, before regeneration became a necessity. In general, the tests were conducted in the manner previously described. However, two slightly different feed stocks were employed, to both of which hydrogen (about 2.0 mol percent) was added through the use of a charger functioning at a pressure of 400 p.s.i.g. Analyses of the charge stocks are presented in the following Table V:

TABLE V

| Charge stock | A | B |
|---|---|---|
| Ethylacetylene, p.p.m. | 800 | 1,090 |
| Hydrogen, mol. percent | 2.0 | 1.9 |
| Propane, mol. percent | Trace | Trace |
| Butanes, mol. percent | 49.9 | 47.8 |
| 1-Butene, mol. percent | 0.1 | Nil |
| 2-Butene, mol. percent | 0.1 | 0.1 |
| Butadiene, mol. percent | 47.9 | 50.2 |

All catalysts were used in an amount of 5.0 cc., and, after loading into the reactor, were reduced in situ with hydrogen. The feedstock was charged to the catalyst under a pressure of 20 p.s.i.g., with the catalyst bed inlet temperature maintained at a level of 60° C. All catalysts were prepared by the method incorporating surface impregnation utilizing palladium nitrate.

EXAMPLE IV

A first operation was conducted utilizing charge stock "A" and a catalyst in which 0.1% palladium was surface-impregnated, followed by drying via evaporation and furnace drying at 200° C., with a second impregnation to incorporate 0.006% by weight of copper. Following a first test at 721 GHSV, and 8-hour on-stream processing, the residual ethylacetylene was 50 p.p.m. Over the next 12 hours, the GHSV was raised to 2404, all other conditions remaining the same, and the ethylacetylene content increased to 224 p.p.m. For the next 5 hours (25 hours total), the GHSV was increased to 2650, with the result that the residual ethylacetylene content was 207 p.p.m. For the next twelve hours, the GHSV was lowered to a level of 705, and the ethylacetylene content of the gaseous effluent decreased to 85 p.p.m., indicating that the catalyst had deactivated during the high GHSV operation.

At this point, after 37 hours total operation, "regeneration" was attempted by passing nitrogen over the catalyst bed at 120° C. A thirteen-hour test was run thereafter, at a GHSV of 673, and analysis showed a residual ethylacetylene content of 200 p.p.m. Obviously, nitrogen-regeneration is not feasible. The catalyst was then regenerated in air at a temperature of 120° C. and reduced with hydrogen in situ. Another thirteen-hour test was conducted to a total on-stream time of 63 hours. At this point, the analysis showed 44 p.p.m. residual ethylacetylene, clearly indicating a regenerated catalyst. Of further significance is the fact that the butadiene content increased from 47.9 mol. percent to 48.8 mol. percent and the butane content decreased from 49.9 to 49.3 mol. percent. Following this successful operation on the air-regenerated catalyst, the catalyst was treated with steam at a temperature of 120° C., followed by hydrogen reduction at 150° C. At a GHSV of 683, and following a test period of 12 hours, the residual ethylacetylene had increased to 175 p.p.m. Steam regeneration appears to have detrimentally affected the catalyst.

EXAMPLE V

This series of tests was conducted at 60° C., 20.0 p.s.i.g., with varying gaseous hourly space velocities, and utilized a catalyst of 0.1% palladium (surface-impregnated) and 0.01% by weight of silver, the latter being incorporated by way of a second impregnation technique, after which the composite was calcined at 600° C. for a period of two hours. The charge stock used was "B" from Table V, containing 1090 p.p.m. of ethylacetylene. Eight tests were effected at varying GHSV's, the results being correlated in the following Table VI:

TABLE VI.—Variable gas hourly space velocity

| GHSV: | Ethylacetylene, p.p.m. |
|---|---|
| 642 | 0 |
| 761 | 47 |
| 775 | 77 |
| 1810 | 159 |
| 2630 | 287 |
| 2700 | 298 |
| 2775 | 366 |
| 5250 | 565 |

When these results are correlated in a graphical representation, a virtual straight-line function is indicated with ethylacetylene concentrations in the range of 75–80 p.p.m. being attained at a gaseous hourly space velocity less than 1000 cubic feet per cubic foot of catalyst per hour.

EXAMPLE VI

The catalyst employed in the operation described in Example V was continued in use for an extended life test. Standard conditions were considered to be 60° C., 20.0 p.s.i.g., 2.0 mol. percent hydrogen in the feed and a GHSV in the range of 500–800. Following 76 hours of operation, using charge stock "B," containing 1090 p.p.m. of ethylacetylene, analysis of the gaseous effluent indicated the concentration shown in the following Table VII:

TABLE VII

| Component: | Mol. percent, p.p.m. |
|---|---|
| Ethylacetylene | 46 |
| Butane | 45.0 |
| Butadiene | 53.0 |
| 1-Butene | 1.2 |
| 2-Butene | 0.8 |
| Hydrogen | 0.0 |

Additional analyses were obtained through 126 hours of on-stream operation: at 99 hours, the ethylacetylene content was 44 p.p.m.; at 114 hours, it was 79 p.p.m. and, at 126 hours, the residual ethylacetylene content was 75 p.p.m. At this point, the catalyst was regenerated in air at a temperature of 120° C. and reduced in hydrogen at 150° C. A subsequent operation, after 143 hours, indicated residual ethylacetylene in an amount of 29 p.p.m.

The regeneration was then repeated, and an analysis taken at 159 hours showed 54 p.p.m. residual ethylacetylene. During the next eleven hours, the GHSV was increased to a level of 5230 with the result that the ethylacetylene content increased to 486 p.p.m., after a total of 170 hours of on-stream operation. Without additional regenerations, and at a lower GHSV of 500–800, the operation continued to a total on-stream time of 283 hours. Spot-check analyses indicated, that, at 180 hours, 36 p.p.m. of ethylacetylene were in the effluent; at 196 hours, 50 p.p.m.; at 212 hours, 29 p.p.m.; at 228 hours, 52 p.p.m.; at 250 hours, 49 p.p.m.; and, at 270 hours, 51 p.p.m. The analysis at 283 hours indicated the concentrations shown in Table VIII:

TABLE VIII.—Extended life test—283 hours

| Component: | Mol. percent, p.p.m. |
|---|---|
| Ethylacetylene | 75 |
| Butane | 47.4 |
| Butadiene | 50.3 |
| 1-Butene | 1.2 |
| 2-Butene | 0.7 |
| Hydrogen | 0.4 |

It is significant that the catalyst bed inlet temperature was increased to 65° C. during the period from 250 to 270 hours, after which the residual ethylacetylene content was 51 p.p.m. From 270 to 283 hours, the termination of the operation, the temperature was increased to 70° C. As indicated in Table VIII, the residual ethylacetylene content increased to 75 p.p.m. It is evident that catalyst deactivation had commenced during the last thirteen hours of the operation, and that the process should be carried out with a temperature less than 70° C.

Throughout the entire series of operations thus far described, one particular item is especially evident. With but few exceptions, hydrogen consumption within the reaction zone was total and complete. This, therefore, indicated that an increase in the hydrogen content of the feed stream was called for. To obtain the higher hydrogen concentration of about 3.2 mol. percent, the charger pressure was increased to 580 p.s.i.g. from the 400 p.s.i.g. required for a 2.0 mol. percent hydrogen concentration.

EXAMPLE VII

For the purpose of this particular operation, 8.5 cc. of the 20/30 mesh, 0.1% palladium catalyst, without modifiers, were used. The various test runs were conducted at 60° C. and 20 p.s.i.g., using charge stock "B" containing 1090 p.p.m. of ethylacetylene. Residual ethylacetylene values were compared at varying gaseous hourly space velocities utilizing the hydrogen content of the feedstock as a parameter, specifically 2.0 mol. percent and 3.2 mol. percent.

In the following Table IX, the results of the series of tests with 2.0% hydrogen are presented. In Table X, the results of the series at 3.2 mol. percent hydrogen are presented.

TABLE IX

| Test No. | 1 | 2 | 3 | 4 |
|---|---|---|---|---|
| GHSV | 322 | 200 | 179 | 675 |
| Product analysis: | | | | |
| Ethylacetylene, p.p.m. | 63 | 43 | 44 | 78 |
| Butane, mol. percent | 47.2 | 47.3 | 47.4 | 50.2 |
| Butadiene | 50.4 | 50.0 | 49.9 | 48.2 |
| 1-butene | 1.6 | 1.5 | 1.4 | 1.4 |
| 2-butene | 0.8 | 0.7 | 1.8 | 1.8 |
| Hydrogen | 0.0 | 0.0 | 0.0 | 0.0 |

TABLE X

| Test No. | 5 | 6 | 7 | 8 |
|---|---|---|---|---|
| GHSV | 328 | 210 | 309 | 670 |
| Product analysis: | | | | |
| Ethylacetylene, p.p.m. | 56 | 18 | 26 | 38 |
| Butane, mol. percent | 47.2 | 47.8 | 46.6 | 46.4 |
| Butadiene | 49.8 | 48.5 | 50.2 | 50.4 |
| 1-butene | 2.0 | 2.2 | 2.1 | 2.1 |
| 2-butene | 1.0 | 1.5 | 1.0 | 1.1 |
| Hydrogen | 0.0 | 0.0 | 0.0 | 0.0 |

A graphical correlation of the data from Tables IX and X presents two straight-line functions, distinctly separate one from the other and virtually parallel. Coupled with the data from the foregoing tables, it is clear that lower residual ethylacetylene values can be achieved with higher hydrogen concentrations, and can be decreased 30–40 p.p.m. at a given GHSV.

After the end of Test 8 (in Table X), the catalyst service was 286 hours. The operation continued at 60° C., 20.0 p.s.i.g., varying GHSV's, and with 3.2 mol. percent hydrogen in the charge stock. The unit was shut down after a total on-stream time of 582 hours with the final ethylacetylene content being only 54 p.p.m.

EXAMPLE VIII

This example is presented for the primary purpose of substantiating the lower limit of catalyst bed inlet temperature. As hereinbefore, the catalyst bed inlet temperature is within the range of from about 35° C. to about 65° C.

The catalytic composite was the previously described 0.1% by weight of palladium (surface-impregnated) on the lithiated alumina carrier material (0.5% by weight of lithium). At a reactor pressure of 20 p.s.i.g. and a GHSV of 580–700, using the charge stock containing 1090 p.p.m., the catalyst bed inlet temperature was varied from 35° C. to 60° C. Twelve-hour test periods were conducted at each temperature level, the results thereof being presented in the following Table XI:

TABLE XI

| Temperature, ° C. | Ethylacetylene, p.p.m. |
|---|---|
| 60 | 62 |
| 55 | 77 |
| 50 | 69 |
| 45 | 64 |
| 40 | 67 |
| 35 | 122 |
| 35 | 148 |
| 60 | 90 |

TABLE XII

| Component | Charge | 55° C. | 35° C. |
|---|---|---|---|
| Ethylacetylene, p.p.m. | 1,090 | 77 | 148 |
| Butane, mol. percent | 46.9 | 45.1 | 47.1 |
| Butadiene | 50.0 | 53.0 | 51.1 |
| 1-butene | 0.1 | 1.3 | 1.2 |
| 2-butene | 0.1 | 0.6 | 0.6 |
| Hydrogen | 2.0 | 0.0 | 0.0 |

Other analyses obtained during the 55° C. period and the second 35° C. period are indicated in the following Table XII. For convenience in comparison, the charge stock analysis is also presented.

The foregoing specification, and particularly the illustrative examples and the data presented therein, indicates the benefits afforded through the use of the present invention in a process for the selective hydrogenation of $C_4$-acetylenes in a butadiene concentrate.

I claim as my invention:

1. A process for the selective hydrogenation of a $C_4$-acetylene in admixture with butadiene, without substantial hydrogenation of the butadiene, which comprises reacting said mixture with hydrogen in an amount in excess of that required to convert said $C_4$-acetylene and less than 0.1 mole of hydrogen per mole of butadiene, at a temperature below about 70° C., in contact with a catalyst comprising an alumina carrier material, from 0.01% to about 0.5% by weight of a surface-impregnated Group VIII noble metal being contained in a surface shell having a thickness not greater than 0.005 inch and from about 0.1% to about 1.0% by weight of an alkali metal.

2. The process of claim 1 further characterized in that said catalyst additionally contains from about 0.001% to about 0.015% by weight of a Group I–B metal selected from copper and silver.

3. The process of claim 1 further characterized in that said mixture and hydrogen are reacted at a temperature of from 35° C. to about 65° C., a pressure from 10 p.s.i.g. to about 40 p.s.i.g. and a gas hourly space velocity less than about 1000.

4. The process of claim 2 further characterized in that said catalyst additionally contains from about 0.001% to about 0.01% by weight of copper.

5. The process of claim 2 further characterized in that said catalyst additionally contains from about 0.005% to about 0.015% by weight of silver.

6. A catalyst particle consisting essentially of alumina, from about 0.1% to about 1.0% by weight of lithium, from about 0.01% to about 0.5% by weight of a surface-impregnated Group VIII noble metal being contained in a surface shell having a thickness not greater than 0.005 inch and from about 0.001% to about 0.15% by weight of a Group I–B metal selected from copper and silver.

7. The catalyst of claim 6 further characterized in that said Group VIII noble metal is platinum.

8. The catalyst of claim 6 further characterized in that said Group VIII noble metal is palladium.

(References on following page)

References Cited

UNITED STATES PATENTS

| | | | |
|---|---|---|---|
| 3,003,008 | 10/1961 | Fleming | 260—681.5 |
| 3,075,917 | 1/1963 | Kronig et al. | 208—255 |
| 3,091,654 | 5/1963 | Kestner | 260—681.5 |
| 3,328,479 | 6/1967 | Schneider et al. | 260—681.5 |
| 3,342,891 | 9/1967 | Poons et al. | 260—681.5 |
| 3,373,219 | 3/1968 | Kronig et al. | 260—681.5 |
| 3,412,169 | 11/1968 | Clark | 260—677 |
| 3,325,556 | 6/1967 | De Rosset | 260—677 |
| 3,541,178 | 11/1970 | Nettesheim | 260—681.5 R |
| 3,555,106 | 1/1971 | Ottmori | 260—681.5 R |

OTHER REFERENCES

Rieche et al., "Hydrogenation of Vinylacetylene," Drennstoffe-Chemie 42(6), pp. 177–185, June 1961.

DELBERT E. GANTZ, Primary Examiner

V. O'KEEFE, Assistant Examiner

U.S. Cl. X.R.

252—466, 474